(12) United States Patent
Nakano et al.

(10) Patent No.: US 8,670,234 B2
(45) Date of Patent: Mar. 11, 2014

(54) ELECTRONIC CONTROL DEVICE

(75) Inventors: Kazuhiko Nakano, Isesaki (JP);
Hirofumi Watanabe, Isesaki (JP);
Daisuke Yasukawa, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 102 days.

(21) Appl. No.: 13/470,378

(22) Filed: May 14, 2012

(65) Prior Publication Data

US 2013/0010426 A1   Jan. 10, 2013

(30) Foreign Application Priority Data

Jul. 7, 2011   (JP) ................................. 2011-150504

(51) Int. Cl.
*H05K 7/20*   (2006.01)

(52) U.S. Cl.
USPC ............ 361/690; 361/704; 361/708; 361/715

(58) Field of Classification Search
None
See application file for complete search history.

(56) References Cited

U.S. PATENT DOCUMENTS

| | | | |
|---|---|---|---|
| 6,548,972 B2* | 4/2003 | Takagi | 318/293 |
| 6,757,168 B2* | 6/2004 | Yatougo et al. | 361/690 |
| 7,113,400 B2* | 9/2006 | Nagata et al. | 361/690 |
| 2001/0021103 A1* | 9/2001 | Takagi | 361/752 |
| 2002/0154466 A1* | 10/2002 | Morino et al. | 361/211 |
| 2003/0184969 A1* | 10/2003 | Itabashi et al. | 361/688 |
| 2004/0150951 A1* | 8/2004 | Yatougo et al. | 361/690 |
| 2006/0187859 A1* | 8/2006 | Shaffer et al. | 370/260 |
| 2011/0235289 A1* | 9/2011 | Watanabe et al. | 361/752 |
| 2012/0069532 A1* | 3/2012 | Azumi et al. | 361/752 |
| 2013/0033823 A1* | 2/2013 | Nagashima et al. | 361/714 |

FOREIGN PATENT DOCUMENTS

| | | |
|---|---|---|
| JP | 2009-106073 | 5/2009 |
| JP | 2010-093986 | 4/2010 |
| JP | 2010-132103 | 6/2010 |

OTHER PUBLICATIONS

JP Office Action for Japanese Application No. 2011-150504, issued on Jun. 25, 2013.

* cited by examiner

*Primary Examiner* — Gregory Thompson
(74) *Attorney, Agent, or Firm* — Antonelli, Terry, Stout & Kraus, LLP.

(57) ABSTRACT

An electronic control device for controlling an electric actuator, including an air passage within a casing that is fixable to an actuator housing of the electric actuator. A circuit board is accommodated in the casing. A projecting portion is formed in the casing, on which a region of the circuit board in which the heat generating part is installed is seated. A vent hole extends through the casing to communicate to an outside of the casing. A communication hole extends through the casing to communicate to an inside of the actuator housing. The air passage allows air to flow between the vent hole and the communication hole when the electric actuator is driven in a state that the casing is fixed to the actuator housing.

8 Claims, 8 Drawing Sheets

ELECTRONIC CONTROL DEVICE

BACKGROUND OF THE INVENTION

The present invention relates to an electronic control device.

Conventionally, there has been proposed an electronic control device including a circuit board to which electronic parts are installed, and a radiating member that is fixed to the circuit board and radiates heat generated from the electronic parts.

Japanese Patent Application Unexamined Publication No. 2010-132103 discloses an electronic control device that is adapted to control a braking force of a vehicle by drivingly controlling a motor as an electric actuator by operation of a vehicle driver. In the electronic control device, a control circuit for drivingly controlling the motor is accommodated within a box-shaped casing made of metal. A plurality of fins are projectingly formed on an outer surface of the casing, so that heat generated from a heat generating part, for instance, a switching element of an inverter circuit, among electronic parts constituting the control circuit is radiated from the outer finned surface of the casing to the outside.

SUMMARY OF THE INVENTION

However, the electronic control device of the above-described conventional art is constructed without consideration of heat radiation by using air flow within the casing. Therefore, it is desirable to enhance the effect of cooling the heat generating part.

The present invention has been made in view of the above-described technological problem. It is an object of the present invention to provide an electronic control device capable of effectively cooling a heat generating part by using air flow within a casing of the electronic control device.

In the electronic control device of the present invention, the heat transferred from the heat generating part to the projecting portion is radiated to the outside of the casing by using air flowing between the vent hole and the communication hole through the clearance. Accordingly, the electronic control device can effectively cool the heat generating part.

In one aspect of the present invention, there is provided an electronic control device for controlling an electric actuator, including:

a casing fixable to an actuator housing of the electric actuator;

a circuit board accommodated in the casing, on which electronic parts including a heat generating part are installed;

a projecting portion projecting from an inside surface of the casing, a region of the circuit board in which the heat generating part is installed being seated on the projecting portion;

an air passage formed between the inside surface of the casing, the circuit board and an outer peripheral surface of the projecting portion;

a vent hole extending through the casing to communicate the air passage and an outside of the casing with each other; and a communication hole extending through the casing such that when the casing is fixed to the actuator housing, an inside space of the actuator housing and the air passage are communicated with each other through the communication hole, wherein the air passage allows air to flow between the vent hole and the communication hole when the electric actuator is driven in a state that the casing is fixed to the actuator housing.

Other objects and features of this invention will become understood from the following description with reference to the accompanying drawings.

DETAILED DESCRIPTION OF THE INVENTION

Figure 1:
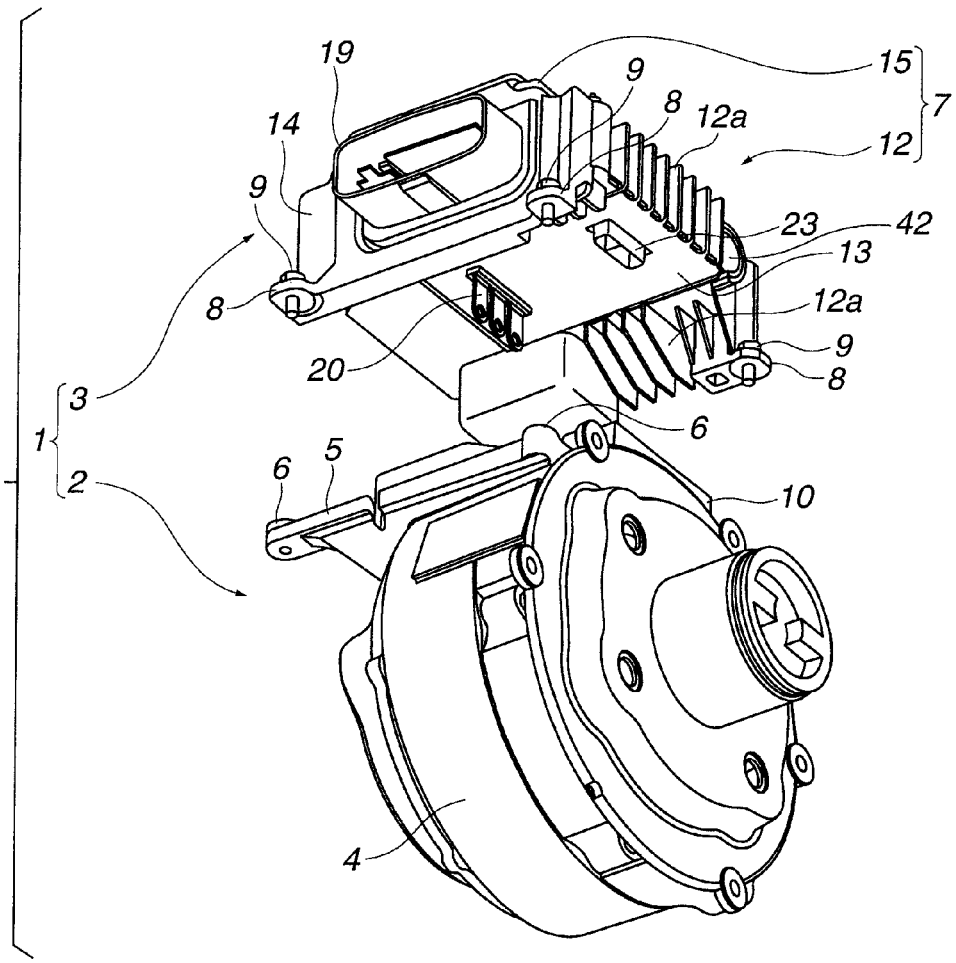
FIG. 1 is an exploded perspective view of an actuator unit to which an electronic control device according to an embodiment of the present invention is applied.

Referring to FIG. 1 to FIG. 8, an electronic control device according to an embodiment of the present invention is explained. In this embodiment, the electronic control device is applied to an actuator unit to be used in an electric brake power assist apparatus that is mounted to a vehicle such as an automobile. For ease of understanding, various directional terms, directional terms such as "upper", "upward", "downward", etc. are used in the following description, but merely denote directions as viewed in the drawings.

Figure 2:
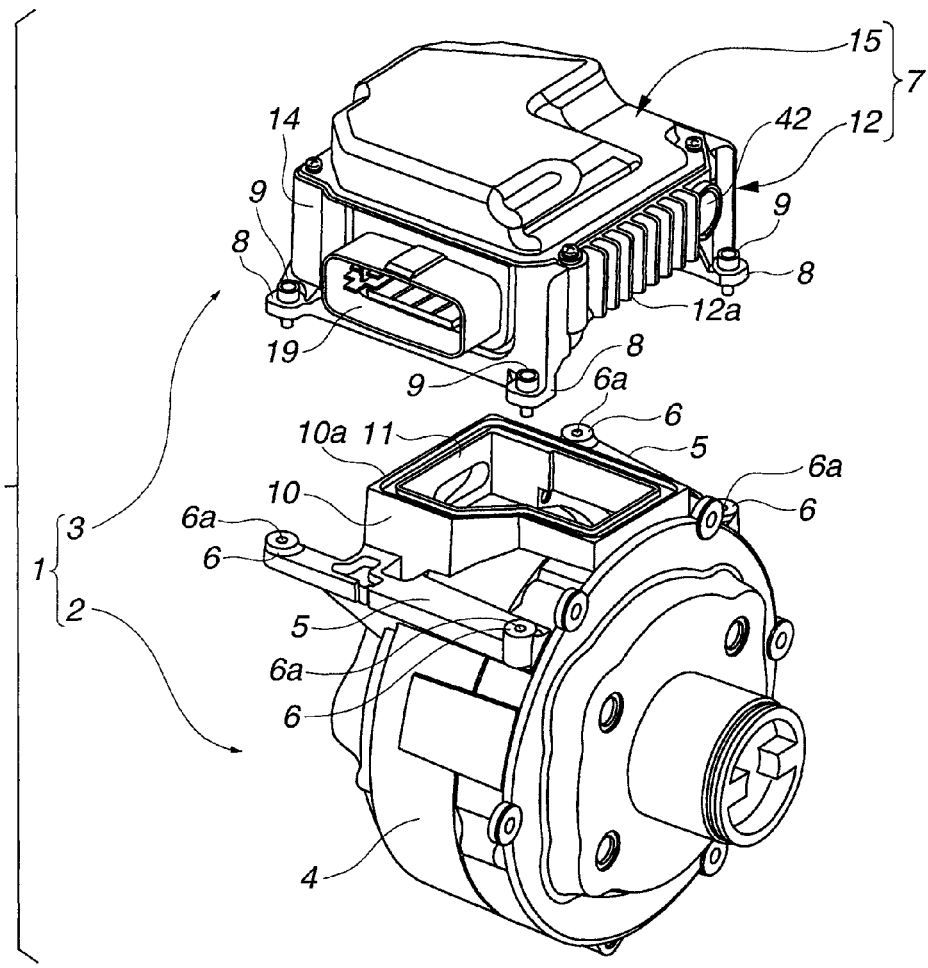
FIG. 2 is an exploded perspective view of the actuator unit as shown in FIG. 1, when viewed from a direction different from that in FIG. 1.

As shown in FIG. 1 and FIG. 2, actuator unit 1 includes electric motor 2 as an electric actuator which is driven by a three-phase alternating-current power to control a fluid pressure of brake fluid, and motor control device 3 as an electronic control device which drives and controls electric motor 2 in accordance with a brake operation by a vehicle driver or an operating condition of the vehicle. Electric motor 2 actuates a so-call ball-screw mechanism (not shown) to move a piston (not shown) in an advance direction and a retreat direction to thereby control the fluid pressure of brake fluid.

Electric motor 2 includes motor housing 4 as an actuator housing which has a pair of bases 5 on an outer surface thereof. The pair of bases 5 extend in an axial direction of electric motor 2 and are spaced from each other with a predetermined distance therebetween in a direction perpendicular to the axial direction of electric motor 2. Each of bases 5 includes a seat portion which upwardly extends from both end portions of base 5 and has circular seat surface 6 on an upper end thereof. Threaded hole 6a is formed in the seat portion and opened to seat surface 6. Motor control device 3 includes generally rectangular box-shaped casing 7 constituted of case 12 and cover 15 as explained later. Case 12 includes four legs 8 that are seated on seat surfaces 6 of motor housing 4, respectively. Motor control device 3 is fixed to electric motor 2 by four fastening screws 9 that extend through legs 8 of case 12 and are screwed into threaded holes 6a of motor housing 4.

Figure 3:
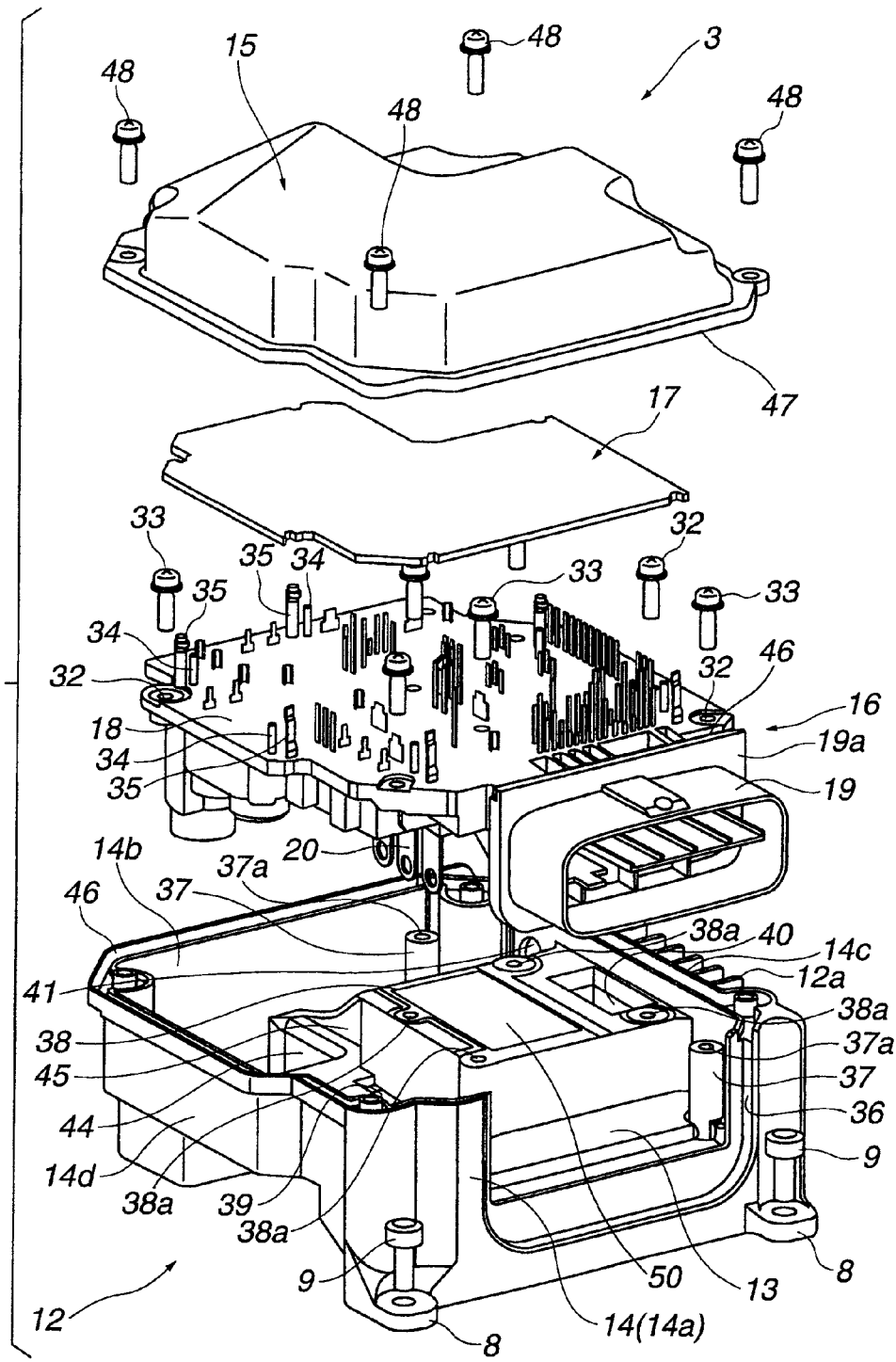
FIG. 3 is an exploded perspective view of a motor control device serving as the electronic control device as shown in FIG. 1.

As shown in FIG. 1 to FIG. 3, case 12 of casing 7 includes bottom wall 13 and side peripheral wall 14 upwardly extending from a periphery of bottom wall 13. Case 12 is formed into a box-shape which has a generally rectangular shape in plan view and an upper open end. Cover 15 covers the open end of case 12. Cover 15 is formed into a generally rectangular shape in plan view. Case 12 is fixed to motor housing 4 in such a state that bottom wall 13 is opposed to the side of motor housing 4. Case 12 is made of metal and molded by so-called aluminum die casting. Cover 15 is made of metal and formed by pressing a metal plate.

On the other hand, motor housing 4 includes generally rectangular tubular wall 10 that upwardly extends from the outer surface of motor housing 4 between opposed bases 5. When casing 7 of motor control device 3 is fixed to motor housing 4, stator connecting portion 20 and sensor connecting portion 23 of motor control device 3 are exposed to an inside of motor housing 4 through inside opening 11 of tubular wall 10, and are connected to a stator (not shown) and a rotational position sensor (not shown), respectively, within motor housing 4. Meanwhile, as is generally known, the rotational position sensor detects a rotational position of a rotor (not shown) disposed within motor housing 4. Motor control device 3 controls electric motor 2 in accordance with an output signal of the rotational position sensor. Tubular wall 10 has a closed loop-shaped groove 10a on an upper end surface thereof. Motor housing 4 is sealed from outside by a seal (not shown) that is disposed in groove 10a and brought into press-contact with bottom wall 13 of case 12.

Casing 7 of motor control device 3 accommodates power module 16 and control module 17 which are stacked on bottom wall 13 of case 12 with a predetermined clearance therebetween in this order. Power module 16 corresponds to a circuit board according to the present invention.

Figure 4:
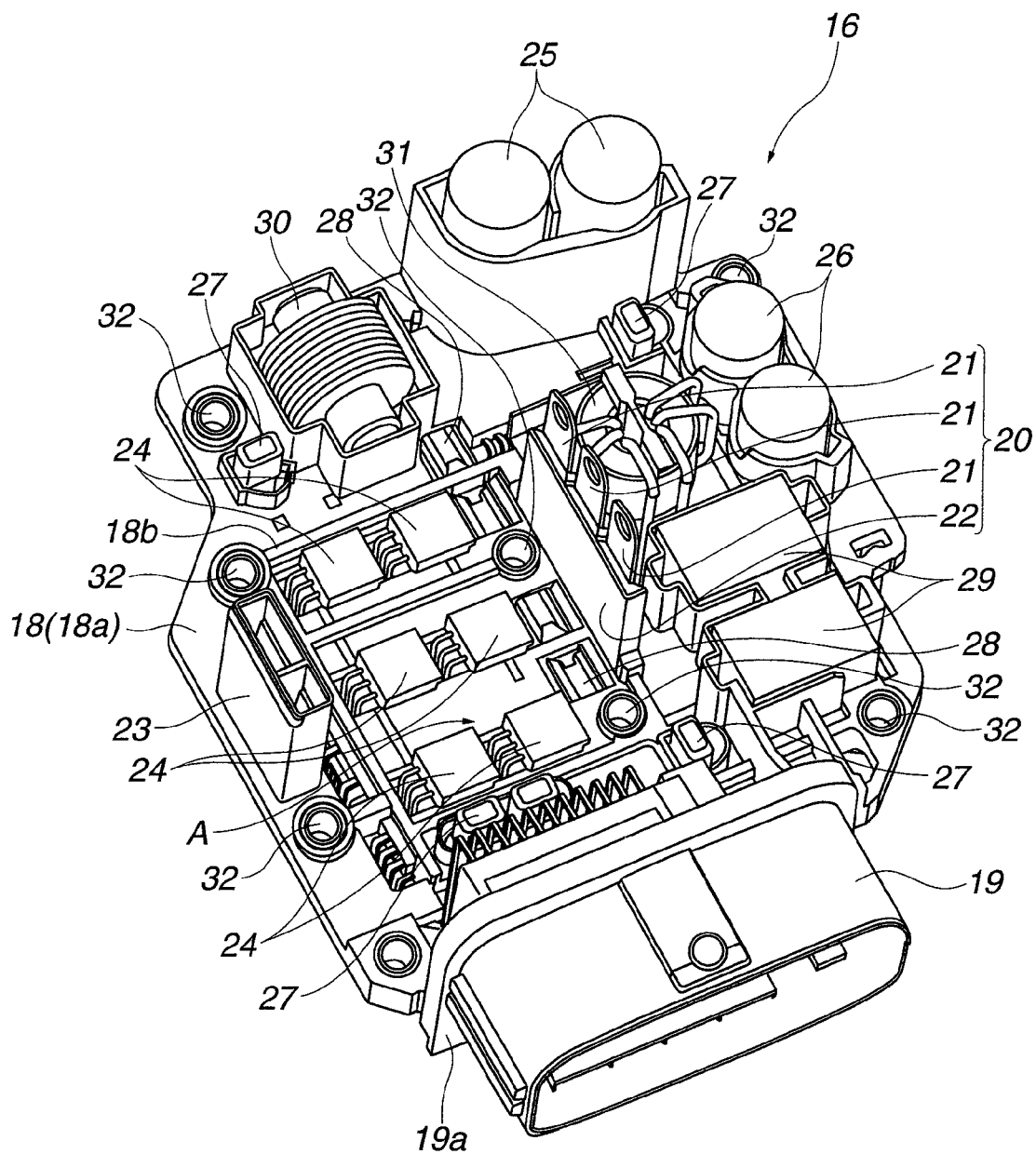
FIG. 4 is a perspective view of a power module of the motor control device as shown in FIG. 3.
Figure 5:
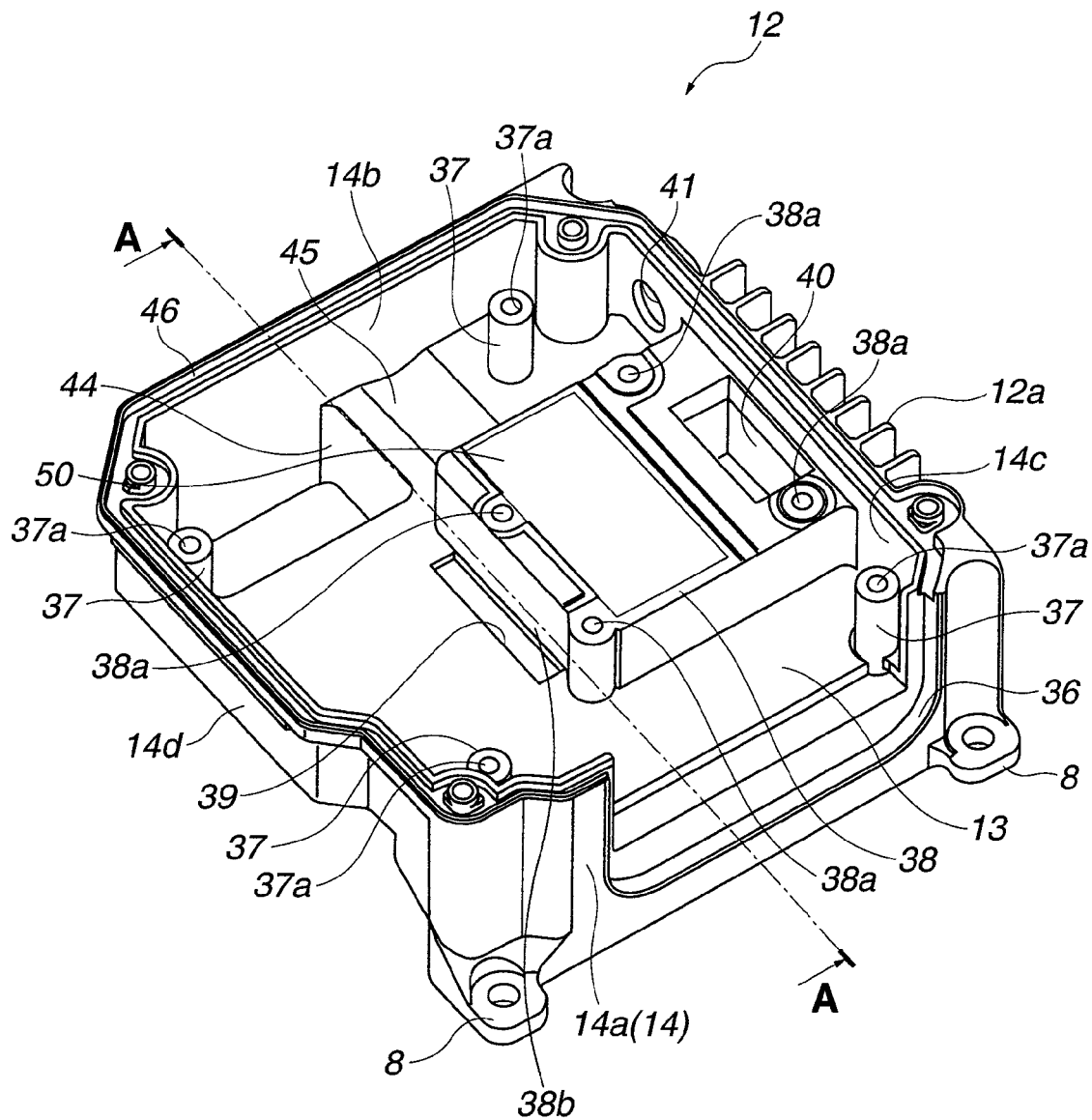
FIG. 5 is a perspective view of a housing of the motor control device as shown in FIG. 3.

Power module 16 is made of a resin material. As shown in FIG. 3 and FIG. 4, power module 16 has a generally flat plate shape, and includes plate-shaped base 18, various kinds of electronic parts installed on part installing surface 18a of base 18, external connector 19 integrally formed with one end edge of base 18, stator connecting portion 20 disposed on part installing surface 18a, and sensor connecting portion 23 disposed on part installing surface 18a. Base 18 has multiple metal busbars embedded therein. Part installing surface 18a of base 18 is opposed to the side of bottom wall 13 of case 12. External connector 19 is exposed to an outside of case 12 through opening 36 formed in case 12, and serves to connect power module 16 with an external electronic equipment for transfer of a signal and an electric power therebetween. Stator connecting portion 20 is disposed so as to project from a substantially central part of part installing surface 18a, and is electrically connected with the stator (not shown) of electric motor 2. Sensor connecting portion 23 is disposed so as to upwardly project from part installing surface 18a on one side portion of base 18 which is located on the side opposed to stator connecting portion 20. Sensor connecting portion 23 is electrically connected with the rotational position sensor (not shown) of electric motor 2.

Stator connecting portion 20 includes three power supply terminals 21, and cover portion 22 that covers a root portion of respective power supply terminals 21. Power supply terminals 21 are connecting members arranged in alignment with each other in a direction perpendicular to the one end edge of base 18 along which external connector 19 is formed. Cover portion 22 is disposed so as to project from part installing surface 18a of base 18, and has a generally elongated rectangular shape in section. On the other hand, sensor connecting portion 23 includes a connecter housing having a generally elongated rectangular shape in section which is elongated in a direction parallel to the direction of alignment of power supply terminals 21. A plurality of terminals (not shown) are accommodated in the connecter housing.

Next, the electronic parts installed on part installing surface 18a of base 18 of power module 16 are explained in detail. As shown in FIG. 4, switching element mounting region A as a heat generating part installing region is formed on part installing surface 18a between stator connecting portion 20 and sensor connecting portion 23. Switching element mounting region A is surrounded by projected frame 18b having a generally rectangular shape in plan view. Six switching elements 24 which are heat generating parts are installed in switching element mounting region A. Six switching elements 24 form a generally known inverter circuit that converts a direct current supplied through external connector 19 into a three-phase alternating current. The three-phase alternating current outputted from the inverter circuit is supplied to electric motor 2 through stator connecting portion 20, and drives electric motor 2 to rotate. In this embodiment, a so-called MOSFET (metal oxide semiconductor field-effect transistor) is used as respective switching elements 24.

Further, installed on part installing surface 18a of base 18 are a pair of first electrolytic capacitors 25, a pair of second electrolytic capacitors 26, a plurality of ceramic capacitors 27, a plurality of shunt resistors 28 for detecting a current, a pair of relays 29 for protecting the circuit, normal mode coil 30 and common mode coil 31. First electrolytic capacitors 25 are formed into a generally cylindrical shape extending from part installing surface 18a in a direction perpendicular to part installing surface 18a. Second electrolytic capacitors 26 are also formed into a generally cylindrical shape extending from part installing surface 18a in a direction perpendicular to part installing surface 18a, and have an axial length shorter than that of first electrolytic capacitors 25. Respective coils 30, 31 serve as a noise filter part that reduces noise as well as first and second electrolytic capacitors 25, 26. First electrolytic capacitors 25 and normal mode coil 30 are arranged on part installing surface 18a at the other end portion of base 18 which is located on the side opposed to external connector 19. Second electrolytic capacitors 26, common mode coil 31 and relays 29 are arranged on part installing surface 18a on the side opposite to sensor connecting portion 23, that is, on the other side portion of base 18. Stator connecting portion 20 is disposed between the side where sensor connecting portion 23 is provided, and the side where second electrolytic capacitors 26, common mode coil 31 and relays 29 are provided.

Base 18 has mounting through holes 32 in the vicinity of four corners thereof and in the vicinity of four corners of switching element mounting region A. Power module 16 is fixed to case 12 by a plurality of power module fastening screws 33 that extend through mounting through holes 32, respectively.

Base 18 has a control module supporting surface that is located on the side opposed to part installing surface 18a, namely, that faces to cover 15, on which a plurality of generally cylindrical control module supporting portions 34 and a plurality of pawls 35 are formed to upwardly project from the control module mounting surface. Control module 17 is seated on control module supporting portions 34 with the predetermined clearance from base 18, and held by pawls 35 in a so-called snap-fit coupling manner.

Control module 17 includes a substrate made of a nonconductive resin material, for instance, a glass epoxy resin. Conductive patterns (not shown) are formed on upper-side and rear-side surfaces of the substrate. Multiple electronic parts (not shown) are installed on the substrate. Control module 17 is electrically connected with power module 16 through multiple terminals projecting from base 18 of power module 16. Control module 17 receives information relating to a brake operation by the vehicle driver and a driving condition of the vehicle through external connector 19, generates a drive command signal on the basis of the information, and outputs the drive command signal to respective switching elements 24 to thereby actuate respective switching elements 24 to drive electric motor 2.

As shown in FIG. 5 to FIG. 8, side peripheral wall 14 of case 12 includes first wall 14a, second wall 14b opposed to first wall 14a, third wall 14c extending between first and second walls 14a, 14b and bending relative thereto, and fourth wall 14d opposed to third wall 14c.

First wall 14a has opening 36 through which external connector 19 of power module 16 extends. Opening 36 downwardly extends from an upper edge of first wall 14a such that almost all area of first wall 14a is cut out. Opening 36 is configured to conform to flange 19a formed at a root portion of external connector 19. Flange 19a is fixed to a peripheral edge of opening 36 through an adhesive seal material (not shown). Third wall 14c extending from first wall 14a and bending relative to first wall 14a has cooling fins 12a on an outer surface thereof.

An upper tip end edge of side peripheral wall 14 of case 12 and an upper end edge of flange 19a of external connector 19 are formed with seal groove 46 having a closed loop shape. Cover 15 has projecting portion 47 formed along an outer peripheral edge of cover 15. Cover 15 is fixed to case 12 by tightening a plurality of cover mounting screws (see FIG. 3) in such a state that projecting portion 47 is engaged in seal groove 46. Meanwhile, an adhesive (not shown) having a sealability is coated on seal groove 46 to thereby seal a clearance between cover 15 and case 12.

Bottom wall 13 of case 12 includes generally cylindrical power module supporting portions 37 that project from near four corners of bottom wall 13 toward cover 15. Further, bottom wall 13 includes block-shaped projection 38 that has a generally rectangular shape in plan view and projects from a portion corresponding to switching element mounting region A of base 18 of power module 16 toward cover 15. Block-shaped projection 38 corresponds to a projecting portion according to the present invention.

Block-shaped projection 38 extends from a substantially middle portion of third wall 14c which has cooling fins 12a on the outer surface, toward fourth wall 14d. With this construction of block-shaped projection 38, a space having a generally U-shape in plan view is formed between side peripheral wall 14 and block-shaped projection 38, more specifically, between first wall 14a, second wall 14b, fourth wall 14d and block-shaped projection 38. This space serves as an accommodating space in which noise filter parts installed on part installing surface 18a of power module 16, i.e., first and second electrolytic capacitors 25, 26, normal mode coil 30 and common mode coil 31 are accommodated. Further, respective switching elements 24 are arranged on an upper surface of block-shaped projection 38 through heat conductive material 50 as explained later. Connector insertion hole 40 is formed in block-shaped projection 38 on the side of third wall 14c which is offset from a position in which respective switching elements 24 are arranged.

Power supply terminal insertion hole 39 as a communication hole is formed in a position on bottom wall 13 of case 12 which corresponds to stator connecting portion 20 of power module 16, that is, in a position on the side of an upright surface of block-shaped projection 38 which is located on the side of fourth wall 14d. Power supply terminal insertion hole 39 is formed into a slit shape extending along corner portion 38b at which the upright surface of block-shaped projection 38 and bottom wall 13 of case 12 are encountered with each other.

Further, generally circular vent hole 41 is formed in third wall 14c on the side of second wall 14b which is offset from block-shaped projection 38. Vent hole 41 extends through third wall 14c, to which vent filter 42 is attached. Vent filter 42 allows air to pass therethrough, but restrains or prevents water from passing therethrough.

Power module 16 is fixed to case 12 in the following manner. Stator connecting portion 20 of power module 16 is inserted into power supply terminal insertion hole 39 of case 12, and sensor connecting portion 23 of power module 16 is inserted into connector insertion hole 40 of case 12. At the same time, base 18 of power module 16 is set on power module supporting portions 37 and block-shaped projection 38. In this condition, power module fastening screws 33 are screwed into threaded holes 37a, 38a respectively formed in power module supporting portions 37 and block-shaped projection 38, and tightened. Power module 16 is thus fastened and fixed to case 12. As a result, power module 16 is held in place with the predetermined clearance between base 18 of power module 16 and bottom wall 13 of case 12. Respective switching elements 24 installed to switching element mounting region A of base 18 are contacted with the upper surface of block-shaped projection 38.

Heat conductive material 50 is interposed between the upper surface of block-shaped projection 38 and respective switching elements 24, so that heat generated from respective switching elements 24 is transferred to block-shaped projection 38 through heat conductive material 50. With this provision of heat conductive material 50, intimate contact of respective switching elements 24 with heat conductive material 50 can be ensured to thereby enhance heat conduction from respective switching elements 24 to block-shaped projection 38. An elastic sheet made of silicone or the like, and liquid grease may be used as heat conductive material 50. Otherwise, respective switching elements 24 may be directly contacted with block-shaped projection 38 without intervention of heat conductive material 50.

Accommodated within the space having a generally U-shape in plan view which is formed between side peripheral wall 14 of case 12 and block-shaped projection 38, are the electronic parts installed on part installing surface 18a of power module 16, i.e., respective electrolytic capacitors 25, 26, normal mode coil 30 and common mode coil 31 which are electronic parts to obtain noise filter function. These electronic parts are located closer to side peripheral wall 14 and spaced apart from block-shaped projection 38. Owing to this arrangement, electrolytic capacitor receiving recess 44 in which a tip end portion of first electrolytic capacitor 25 is received, and coil receiving recess 45 in which normal mode coil 30 is received, are formed in bottom wall 13 of case 12. By thus fixing power module 16 to case 12, an air gap serving as air passage 43 is generated between the above-described electronic parts and block-shaped projection 38.

Figure 6:
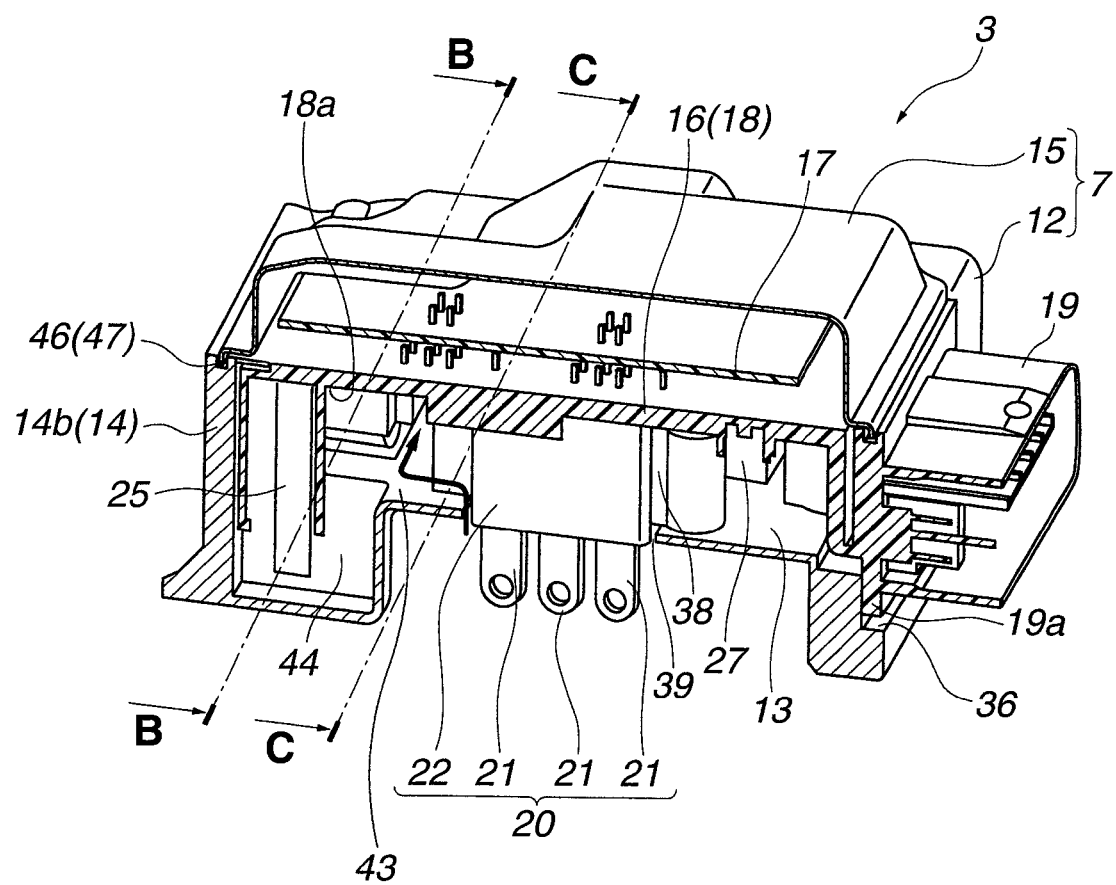
FIG. 6 is a perspective sectional view of the motor control device as shown in FIG. 1, taken along line A-A as shown in FIG. 5.
Figure 7:
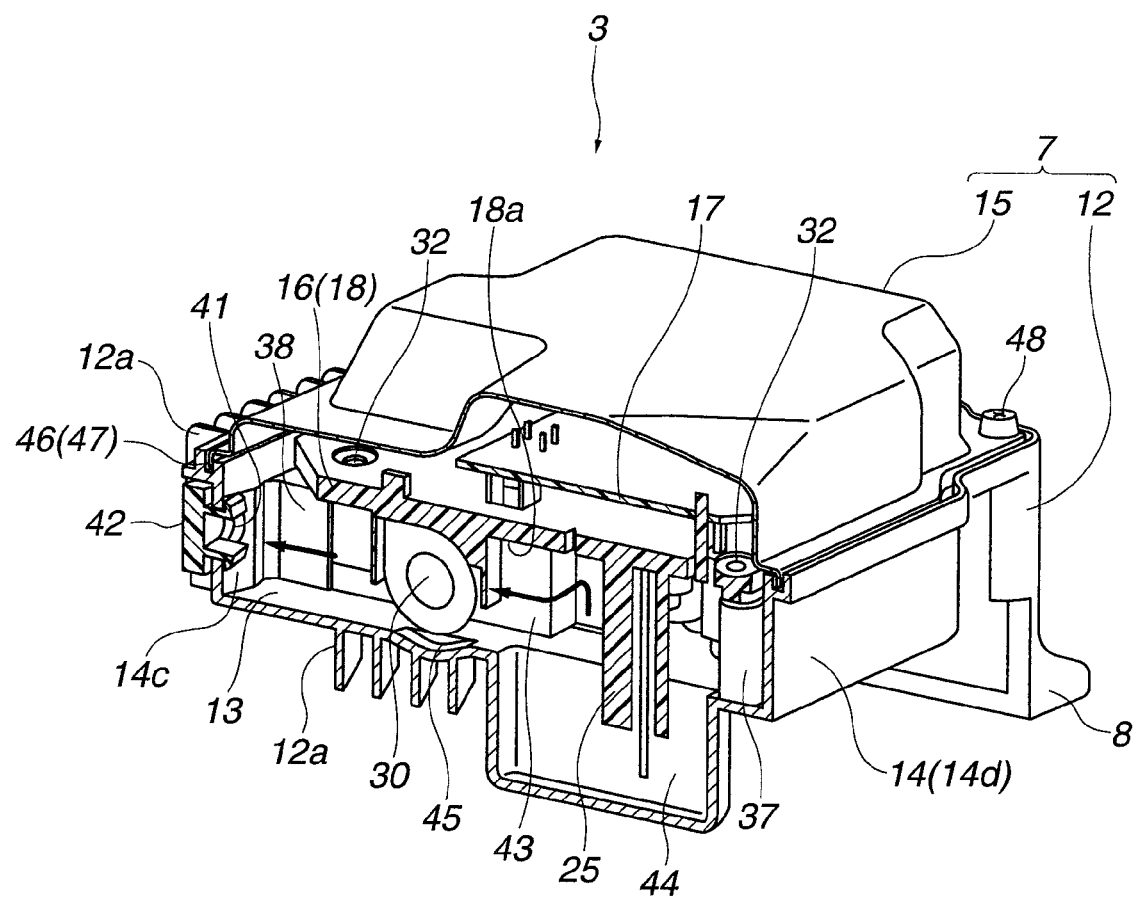
FIG. 7 is a perspective sectional view of the motor control device as shown in FIG. 6, taken along line B-B as shown in FIG. 6.
Figure 8:
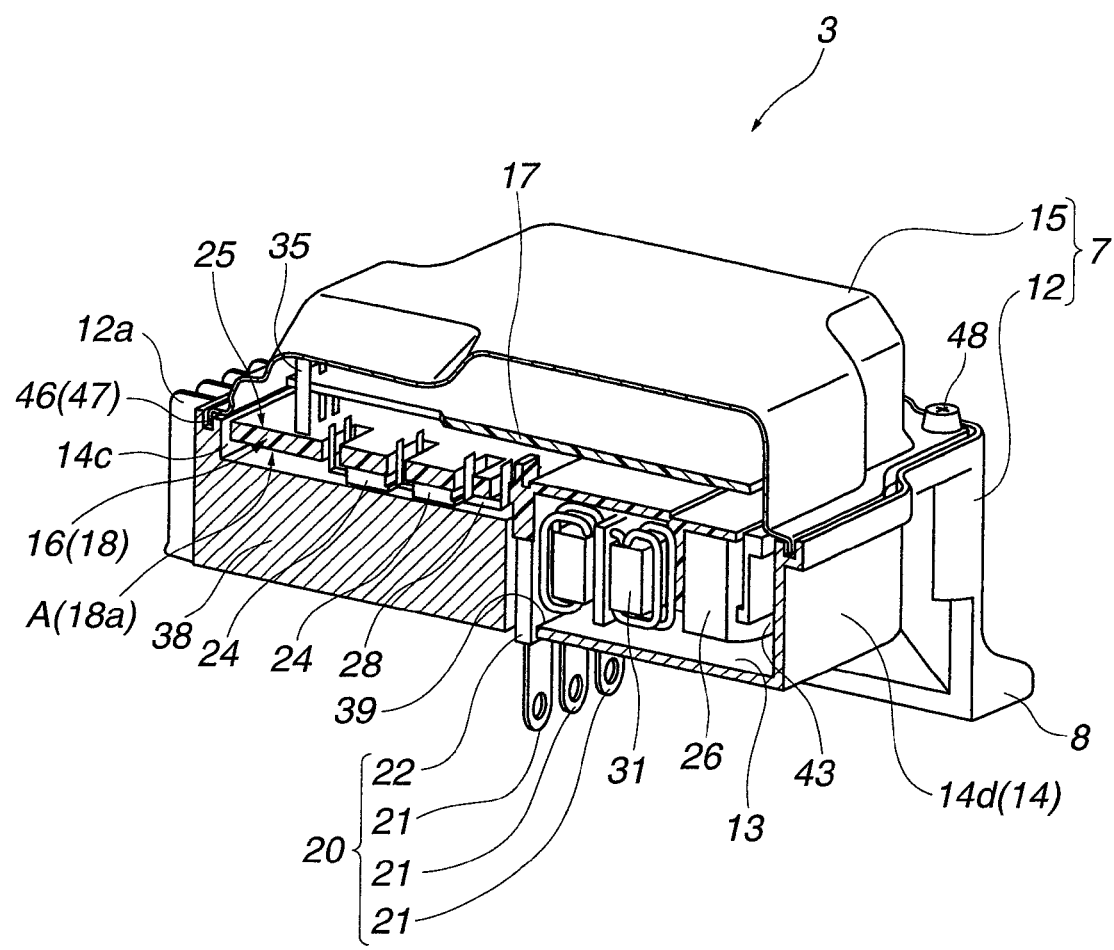
FIG. 8 is a perspective sectional view of the motor control device as shown in FIG. 6, taken along line C-C as shown in FIG. 6.

As seen from FIG. 6 and FIG. 7, air passage 43 includes a first portion located on the side opposed to external connector 19, i.e., on the side of one longitudinal end of case 12. The first portion of air passage 43 is formed between second wall 14b and block-shaped projection 38, and communicated to an outside of case 12 through vent hole 41. Air passage 43 also includes a second portion located in a substantially middle position of case 12 in the longitudinal direction of case 12. The second portion is formed between fourth wall 14d and block-shaped projection 38, and communicated to an inside space of motor housing 4 (see FIG. 1) through power supply terminal insertion hole 39. With this arrangement, the inside space of motor housing 4 is communicated to an outside of motor housing 4 through air passage 43 formed within case 12. That is, air passage 43 that extends between vent hole 41 and power supply terminal insertion hole 39 is bent into an L-shape in plan view, and allows air to flow between vent hole 41 and power supply terminal insertion hole 39 along the upright surfaces of block-shaped projection 38.

Accordingly, in this embodiment, by driving electric motor 2, there is generated an air flow passing through air passage 43 between vent hole 41 and power supply terminal insertion hole 39. Specifically, in a case where electric motor 2 is driven to reduce a volume of the air within motor housing 4, the air within motor housing 4 is expelled therefrom and enters into case 12 through power supply terminal insertion hole 39, and allowed to flow in a direction extending from power supply terminal insertion hole 39 toward vent hole 41, i.e., in a direction as indicated by arrows in FIG. 6 and FIG. 7. On the other hand, in a case where electric motor 2 is driven to increase the volume of the air within motor housing 4, the air within case 12 is sucked into motor housing 4 through power supply terminal insertion hole 39 and allowed to flow in a direction extending from vent hole 41 toward power supply terminal insertion hole 39, i.e., in a direction opposite to the direction indicated by arrows in FIG. 6 and FIG. 7. As a result, upon driving electric motor 2, there is generated a positive air flow in air passage 43.

Thus, heat transferred from respective switching elements 24 to block-shaped projection 38 is absorbed by the air flow passing through air passage 43, and then the heat is radiated from case 12 to the outside. As a result, respective switching elements 24 can be effectively cooled.

Further, since the amount of heat generated from respective switching elements 24 becomes large upon driving electric motor 2, it is possible to allow air to positively flow into air passage 43 at the timing in which the amount of heat generated from respective switching elements 24 increases. Therefore, respective switching elements 24 can be more effectively cooled.

Further, power supply terminal insertion hole 39 is formed into a slit shape extending along corner portion 38b at which bottom wall 13 of case 12 and the upright surface of block-shaped projection 38 on the side of fourth wall 14d of case 12 are encountered with each other. With this construction, the air passing through power supply terminal insertion hole 39 is allowed to flow near block-shaped projection 38. Further, air passage 43 includes the first portion that is located on the side opposed to external connector 19 (i.e., on the side of one longitudinal end of case 12) and communicated with vent hole 41, and the second portion located on the substantially middle position of case 12 in the longitudinal direction of case 12. Thus, the air passage extending between vent hole 41 and power supply terminal insertion hole 39 is bent into the L-shape in plan view, thereby ensuring a length of the air passage as long as possible. With this construction, respective switching elements 24 can be more effectively cooled.

Further, block-shaped projection 38 is connected and contacted with third wall 41c that has cooling fins 12a on the outer surface thereof. With this construction, the heat transferred to block-shaped projection 38 can be radiated from cooling fins 12a to thereby enhance the cooling ability of motor control device 3.

Further, two power module supporting portions 37 located on the side of second wall 14b are exposed to air passage (air gap) 43 extending between vent hole 41 and power supply terminal insertion hole 39. With this construction, it is possible to cool power module 16 through the two power module supporting portions 37.

Further, respective electrolytic capacitors 25, 26 and respective coils 30, 31 which are noise filter parts installed to power module 16 are exposed to air passage (air gap) 43 extending between vent hole 41 and power supply terminal insertion hole 39. With this construction, respective electrolytic capacitors 25, 26 and respective coils 30, 31 also can be effectively cooled.

Further, respective electrolytic capacitors 25, 26 and respective coils 30, 31 which are relatively large-sized electronic parts are arranged around block-shaped projection 38. With this arrangement, it is possible to efficiently use the space within case 12 and accommodate electronic parts within a height range that is defined by a height of block-shaped projection 38. As a result, motor control device 3 can be downsized.

Furthermore, the electronic part having a height larger than the height of block-shaped projection 38, for instance, first electrolytic capacitors 25 is arranged on the side of second wall 14b. With this arrangement, electrolytic capacitor receiving recess 44 can be formed to bulge into motor housing 4 in such a manner that bottom wall 13 of case 12 is recessed toward the inside of motor housing 4. That is, electrolytic capacitor receiving recess 44 can be formed to extend in a dead space between motor control device 3 and motor housing 4, thereby serving to suppress an increase in size of case 12 toward the side of cover 15.

Motor control device 3 according to this embodiment is constructed such that when electric motor 2 is actuated to change the volume of air in motor housing 4, the air within case 12 is allowed to flow through case 12. However, an electric actuator is not limited to the electric motor in this embodiment, and any other electric actuator that generates heat during an operation thereof may be used. In such a case, it is possible to flow the air within case 12 through power supply terminal insertion hole 39 toward vent hole 41 due to expansion of air which is caused by heat generated from the electric actuator. That is, the air within an actuator housing of the electric actuator is expanded to flow into case 12 through power supply terminal insertion hole 39. The air then is allowed to flow through case 12 as indicated by arrows in FIG. 6 and FIG. 7. As a result, the same effects as those of the embodiment can be obtained.

Further, block-shaped projection 38 is not limited to this embodiment in which block-shaped projection 38 extends from side peripheral wall 14. Block-shaped projection 38 may be separated from side peripheral wall 14. Even in such a case, air passage 43 can be desirably formed along at least two upright surfaces of block-shaped projection 38.

This application is based on a prior Japanese Patent Application No. 2011-150504 filed on Jul. 7, 2011. The entire contents of the Japanese Patent Application No. 2011-150504 are hereby incorporated by reference.

Although the invention has been described above by reference to a certain embodiment of the invention and modifications of the embodiment, the invention is not limited to the embodiment and modifications described above. Further variations of the embodiment and modifications described above will occur to those skilled in the art in light of the above teachings. The scope of the invention is defined with reference to the following claims.

What is claimed is:

1. An electronic control device for controlling an electric actuator, comprising:

a casing fixable to an actuator housing of the electric actuator;

a circuit board accommodated in the casing, on which electronic parts including a heat generating part are installed;

a projecting portion projecting from an inside surface of the casing, a region of the circuit board in which the heat generating part is installed being seated on the projecting portion;

an air passage formed between the inside surface of the casing, the circuit board and an outer peripheral surface of the projecting portion;

a vent hole extending through the casing to communicate the air passage and an outside of the casing with each other; and a communication hole extending through the casing such that when the casing is fixed to the actuator housing, an inside space of the actuator housing and the air passage are communicated with each other through the communication hole, wherein the air passage allows air to flow between the vent hole and the communication hole when the electric actuator is driven in a state that the casing is fixed to the actuator housing.

2. The electronic control device as claimed in claim 1, wherein the casing comprises an open ended case in which the circuit board is accommodated, and a cover that covers an open end of the case, the casing being mountable to the actuator housing in such a state that a bottom wall of the case faces to the actuator housing, wherein the projecting portion projects from the bottom wall of the case, wherein the communication hole extends through the bottom wall of the case, and wherein the circuit board comprises a connecting portion that electrically connects the circuit board and the electric actuator with each other, the connecting portion projecting from the circuit board toward the bottom wall of the case and extending through the communication hole.

3. The electronic control device as claimed in claim 2, wherein the electronic parts comprise a noise filter part that reduces noise, the noise filter part being installed on a surface of the circuit board which faces to the bottom wall of the case, the air passage being formed between the noise filter part and the outer peripheral surface of the projecting portion.

4. The electronic control device as claimed in claim 1, wherein the heat generating part is a switching element that is operated to drive the electric actuator.

5. The electronic control device as claimed in claim 2, wherein the communication hole is formed into a slit shape extending along a corner portion at which the outer peripheral surface of the projecting portion and the bottom wall of the case are encountered with each other.

6. The electronic control device as claimed in claim 2, wherein the projecting portion is contacted with a side peripheral wall of the case which has a plurality of cooling fins on an outer surface thereof.

7. The electronic control device as claimed in claim 2, wherein the bottom wall of the case is formed with a plurality of supporting portions extending from the bottom wall toward the cover, the supporting portions being exposed to the air passage between the vent hole and the communication hole.

8. The electronic control device as claimed in claim 2, wherein the heat generating part and the projecting portion on which the heat generating part is seated are contacted with each other through a heat conductive material.

* * * * *